(12) United States Patent
Coffin

(10) Patent No.: US 8,522,517 B2
(45) Date of Patent: Sep. 3, 2013

(54) REEL GANG MOWER HAVING DIFFERENT WIDTH FRONT AND REAR CUTTING UNITS

(75) Inventor: Scott M. Coffin, Plymouth, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 13/336,554

(22) Filed: Dec. 23, 2011

(65) Prior Publication Data

US 2013/0160413 A1    Jun. 27, 2013

(51) Int. Cl.
*A01D 75/30* (2006.01)

(52) U.S. Cl.
USPC ............................................................. 56/7

(58) Field of Classification Search
USPC .................................... 56/6, 7, 229, 249, 295
See application file for complete search history.

(56) References Cited

U.S. PATENT DOCUMENTS

| | | | | |
|---|---|---|---|---|
| 1,904,376 A * | 4/1933 | Kruckemeyer | ...................... | 56/7 |
| 2,099,902 A * | 11/1937 | Moyer et al. | ........................ | 56/7 |
| 2,525,047 A * | 10/1950 | Sawtelle et al. | ...................... | 56/7 |
| 3,429,109 A * | 2/1969 | Heth et al. | ........................... | 56/7 |
| 6,082,086 A * | 7/2000 | Togoshi et al. | ................. | 56/199 |
| 7,637,090 B2 * | 12/2009 | Rinholm et al. | ................ | 56/249 |
| 7,971,415 B2 * | 7/2011 | Phillips | ................................ | 56/7 |
| 8,104,253 B2 * | 1/2012 | Coffin et al. | ........................ | 56/7 |
| 2008/0127619 A1 * | 6/2008 | Link | ................................... | 56/6 |
| 2011/0239603 A1 * | 10/2011 | Coffin et al. | ........................ | 56/7 |
| 2012/0060459 A1 * | 3/2012 | Hironimus et al. | ................. | 56/6 |

\* cited by examiner

*Primary Examiner* — Thomas B Will
*Assistant Examiner* — Joan D Misa
(74) *Attorney, Agent, or Firm* — James W. Miller

(57) ABSTRACT

A reel gang mower has a plurality of front reel cutting units and at least trailing one rear reel cutting unit. Each rear reel cutting unit is centered on a gap between a pair of adjacent front cutting units to cover the gap. Each rear reel cutting unit has a cutting width that is wider than a common cutting width of the front reel cutting units by an amount which is sufficient to maintain positive overlap between the front and rear reel cutting units while mowing when turning or in sidehill mowing such that substantially no uncut strips of grass are left in a cut grass swath provided by the mower.

5 Claims, 7 Drawing Sheets

REEL GANG MOWER HAVING DIFFERENT WIDTH FRONT AND REAR CUTTING UNITS

TECHNICAL FIELD

This invention relates to reel gang mowers having a plurality of reel cutting units arranged in front and rear rows.

BACKGROUND OF THE INVENTION

Riding gang mowers using reel type cutting units are well known for cutting grass. Such mowers deploy a plurality of reel cutting units that are arranged relative to one another to cut a large, unbroken swath of grass during a single pass of the mower over the ground. Usually, a plurality of reel cutting units is disposed in a front row with one or more reel cutting units also being disposed in a rear row that trails the front row taken with respect to the forward direction of motion of the mower. The front cutting units usually outnumber the rear cutting units (e.g. 2 to 1 in a triplex configuration or 3 to 2 in a fiveplex configuration). The front cutting units are laterally spaced apart from one another with gaps being present between the front cutting units. The trailing rear cutting units are also laterally spaced apart from one another, but are positioned so that the ends of the rear cutting units overlap the ends of the front cutting units that are in the interior of the swath to completely cover the gaps between the front cutting units to avoid leaving uncut strips of grass in the cut swath.

In known reel type gang mowers, the front and rear cutting units have the same width. The width of the cutting units can vary from one mower model to another mower model. For example, some mowers might have relatively small cutting units each of which provides 18" of cutting width while other mowers might have relatively large cutting units each of which provides a 27" cutting width. Obviously, mowers having reel cutting units with wider cutting units will cut a larger swath of grass than mowers having reel cutting units with smaller cutting widths when the mowers each have the same number of cutting units. However, it has always been the case in the mower art that once a particular size of cutting units has been selected for use on a particular mower model, all the cutting units used on that mower model, whether front cutting units or rear cutting units, will be the same size.

When reel gang mowers cut grass in a straight swath while moving straight ahead in a forward direction, the designed or nominal overlap provided between the front and rear reel cutting units will be sufficient to cover whatever gaps exist between the front cutting units so that the cut grass swath is unbroken. However, the Applicants have discovered that uncut strips of grass begin to appear in the cut grass swath in at least some of the gaps between the front cutting units when reel gang mowers turn to the left or the right depending on the severity of the turn. In other words, the Applicants have discovered that the nominal overlap of the rear cutting units with the sides of the front cutting units disappears in some of these turning situations with some gaps now appearing in place of the overlaps. Uncut strips of grass are now left in these intermittent or temporary gaps that can appear when the reel gang mowers are turning.

The Applicants have also discovered other mowing situations where such intermittent or temporary gaps appear and leave uncut strips of grass in the cut grass swath. These other mowing situations include S turns by the mower where the mower first turns to one side and then substantially immediately thereafter turns back to the other side. Another such mowing situation is mowing along a sidehill where the mower traverses a fairly steep sidehill by driving in a laterally direction across the sidehill. In this sidehill mowing situation, the back of the cutting units tend to crab or tilt down the sidehill with the backs of the rear cutting units crabbing or tilting downhill somewhat further than the backs of the front cutting units. In both the S turn and sidehill mowing situations described above, the Applicants have discovered that gaps will appear between some of the sides of the rear cutting units and several of the interior sides of the front cutting units, leading again to uncut strips of grass in the cut grass swath.

Traditionally, the prior art approach in reel gang mower design has been to keep the overlap between the front and rear cutting units as small as possible for various reasons. First, a small overlap increases the width of the cut grass swath using identical sized cutting units, thereby increasing mower productivity. Second, a small overlap results in keeping the gaps between the laterally spaced front cutting units as large as possible. Large gaps between the front cutting units are desirable to prevent various clearance and interference issues from arising with respect to the front cutting units when the front cutting units are put into a raised transport position. When the front cutting units are lifted into the raised transport position, the two side front cutting units tip in towards the middle front cutting unit as they lift off the ground such that the side front cutting units fold up along opposite sides of the mower. Thus, using large gaps between the front cutting units helps preclude the possibility that the side front cutting units could hit the middle front cutting unit as they are raised off the ground or that the side front cutting units could interfere with portions of their respective lift arms.

It would be an advance in the mower art to provide a reel type gang mower in which the streaks in the cut grass swath do not happen even in turns or in sidehill mowing. Desirably, however, this would be done without leading to any of the types of productivity and interference problems noted above.

SUMMARY OF THE INVENTION

One aspect of this invention relates to a reel gang mower which comprises a plurality of laterally spaced front reel cutting units having lateral gaps therebetween with each front reel cutting unit providing a width of cut. Each gap is covered by a rear reel cutting unit having a width of cut that spans the gap and that extends beyond opposite sides of the gap to also overlap by an overlap distance a portion of the width of cut of the spaced front cutting units that form the gap such that all the front and rear cutting units collectively cut an unbroken swath of grass during a single pass of the mower. The width of cut of each rear reel cutting unit is wider than the width of cut of each front reel cutting unit.

Another aspect of this invention relates to a reel gang mower which comprises a plurality of front reel cutting units and at least trailing one rear reel cutting unit. Each rear reel cutting unit is substantially centered on a gap between a pair of adjacent front cutting units to cover the gap. Each rear reel cutting unit has a cutting width that is wider than a common cutting width of the front reel cutting units by an amount which is sufficient to maintain positive overlap between the front and rear reel cutting units while mowing when turning or in sidehill mowing such that substantially no uncut strips of grass are left in a cut grass swath provided by the mower.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
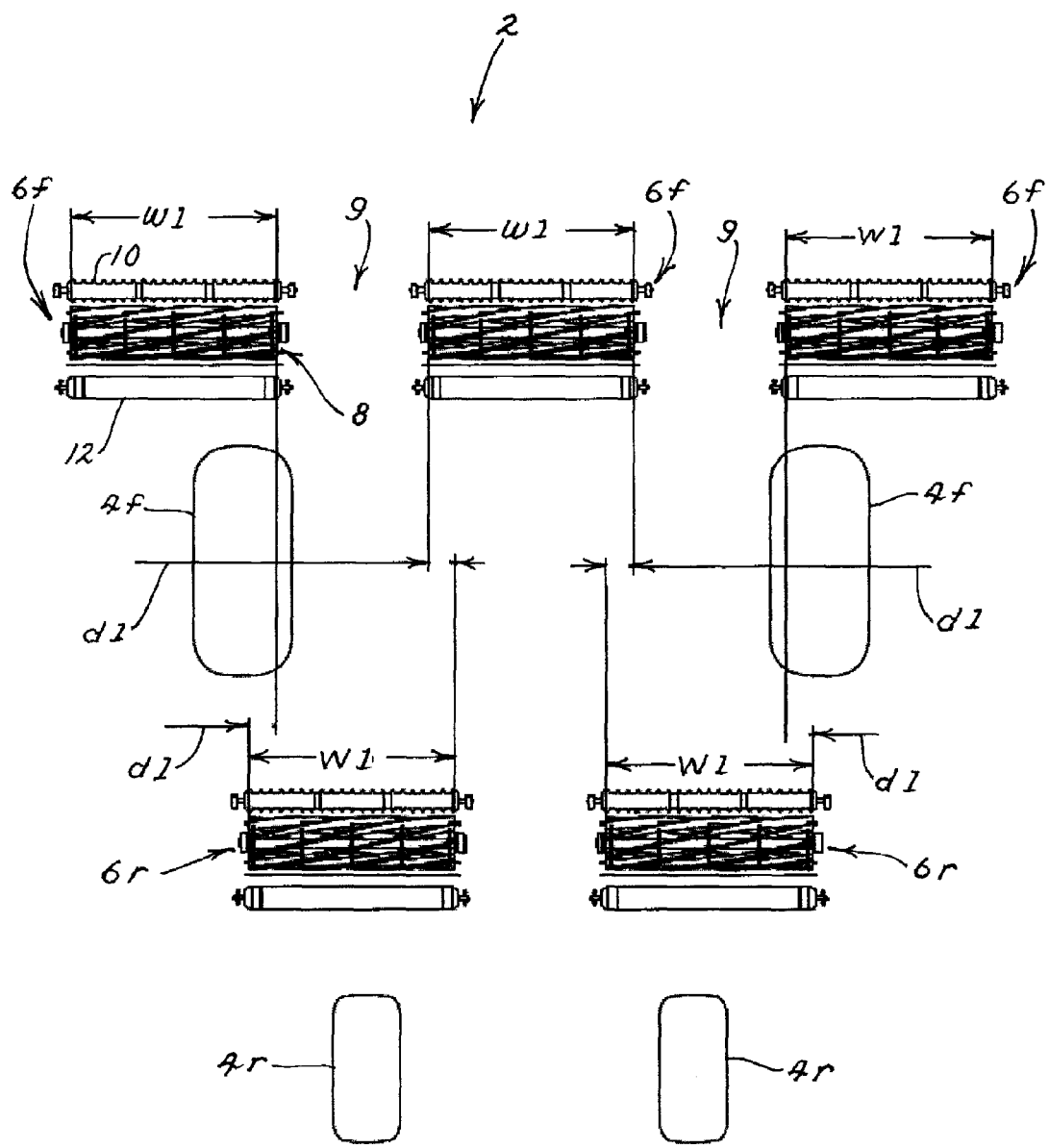
FIG. 1 is a top plan view of a reel gang mower according to the prior art having five identically sized cutting reels arranged in a 3-2 fiveplex configuration.

Referring first to FIG. 1, a reel gang mower of the type to which this invention relates is shown generally as 2. Mower 2 is shown schematically in FIG. 1 to illustrate only the front drive wheels 4f, the rear steerable wheels 4r, and five reel cutting units 6 arranged on mower 2 in a well known 3-2 fiveplex configuration. Each cutting unit 6 is also well known in the art and comprises a helically bladed cutting reel 8 that rotates about a substantially horizontal axis to sweep uncut stalks of grass against a bedknife (not shown) to cut the grass stalks using a shearing action. Each cutting unit 6 is supported for rolling over the ground by its own front and rear rollers 10 and 12, respectively. Cutting units 6 are coupled to the traction frame of mower 2 by various lift arms that permit cutting units 6 to be dropped down into engagement with the ground to mow grass or to be lifted up off the ground into a raised, non-operative transport position.

In the 3-2 fiveplex gang configuration shown in FIG. 1, three front cutting units 6f are located on the front of mower 2 ahead of front wheels 4f. Front cutting units 6f are laterally spaced apart from one another to define two interior gaps g between them. Two rear cutting units 6r are located between front and rear wheels 4f and 4r of mower 2 to trail behind front cutting units 6f. Rear cutting units 6r are also laterally spaced apart from one another and are centered relative to gaps g between front cutting units 6f to cover gaps g. Collectively, all five cutting units 6 will cut an unbroken swath of grass during straight ahead travel that is defined by the width between the laterally outermost edges of the left and right front cutting units 6f.

Mower 2 has front and rear cutting units 6f and 6r that are identical to one another in cutting width, indicated as w1 in FIG. 1. The gap covering ability of rear cutting units 6r is determined by the spacing between front cutting units 6f. Gaps g between front cutting units 6f are designed so that the sides of rear cutting units 6r overlap the sides of front cutting units 6f that lie in the interior of the cut swath ("the interior sides" of front cutting units 6f) by a designed, nominal overlap distance d1. Overlap distance d1 has been traditionally adjusted in the mower art by adjusting the size of gaps g between front cutting units 6f while keeping rear cutting units 6r centered on those gaps. Thus, overlap distance d1 can be increased by moving the left and right front cutting units 6f towards the middle front cutting unit 6f to decrease the size of gaps g while keeping rear cutting units 6r centered on gaps g. This causes the ends of rear cutting units 6r to overlap the interior sides of front cutting units 6f by a larger overlap amount.

However, according to the traditional practices of the mower art, adjusting the overlap in this manner to provide a large overlap distance is not generally followed since it shortens the width of the cutting grass swath for cutting units 6 of the same size. It also is likely to increase interference issues with respect to front cutting units 6f when front cutting units 6f are placed in their transport position on mower 2. In such a transport position, the middle front cutting unit 6f is lifted generally straight upwardly while the two side front cutting units 6f tip or fold inwardly as they lift upwardly with the inwardly tipped front cutting units 6f coming close to the sides of mower 2. When a large overlap distance is achieved by decreasing the gaps g between front cutting units 6f, the side front cutting units 6f may well come too close to the middle front cutting unit 6f or may have interference problems with various portions of the lift arms of mower 2, thereby creating additional engineering problems. So, as a practical matter, prior art mower 2 of FIG. 1 employs five identically sized cutting units 6f having a fairly generous spacing between front cutting units 6f and a necessarily smaller nominal overlap distance d1 provided by rear cutting units 6r. Overlap distance d1 is often only about 2.5 inches.

Figure 3:
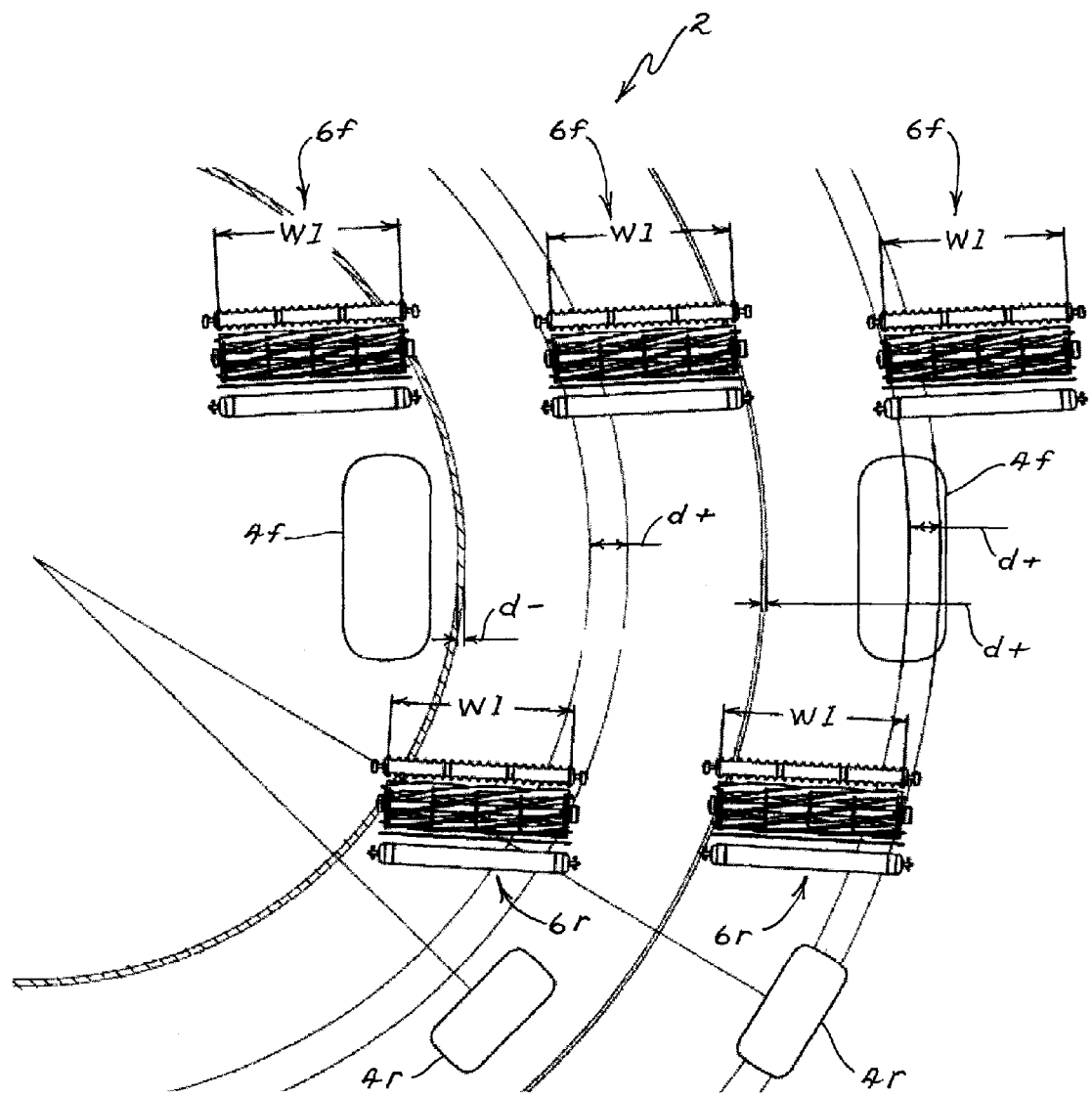
FIG. 3 is a top plan view of the prior art mower of FIG. 1 executing a turn with the front and rear cutting units having 3° degrees of yaw during the turn and showing that one uncut strip of grass appears between the sides of the front and rear cutting units on the very inside of the turn.

However, mower 2 as known in the prior art exhibits various aftercut appearance problems during certain types of maneuvers. As shown in FIG. 3, when mower 2 of FIG. 1 executes a sharp turn to one side, front and rear cutting units 6f and 6r can pivot about their vertical yaw axes to steer around the turn to minimize skidding of cutting units 6. During such a turn, the overlap distance varies from its nominal value of d1 and can either increase or decrease from the nominal value d1 depending on which overlap is involved. For the most part, the overlap distance remains positive even as it varies from its nominal value d1, which positive overlap distance is indicated in FIG. 3 by the legend d+ (d plus). However, the overlap distance between the innermost side of front cutting unit 6f on the inside of the turn and the outermost side of the trailing rear cutting unit 6r actually goes negative, which is indicated in FIG. 3 by the legend d− (d minus), meaning that the overlap has disappeared and a space has now opened up where there had been overlap. The grass is no longer cut in this space such that an uncut strip of grass, represented by the cross-hatching in the space depicted by d−, now appears. This uncut strip of grass forms an undesirable visual mark or streak in the cut grass swath, thereby degrading the aftercut appearance of the grass.

While the problem of streaking caused by uncut strips of grass has been described above with respect to mowers 2 in which cutting units 6 can steer or yaw about a vertical axis, the Applicants have also discovered that this same problem applies to mowers 2 having fixed cutting units 6. Such fixed cutting units 6 can be provided by using steerable cutting units 6 and locking out the ability of cutting units 6 from steering or yawing by pinning or locking cutting units 6 against pivoting about the vertical yaw axis. Alternatively, some types of mowers 2 have cutting units 6 that are designed without any ability to steer or yaw about a vertical axis. The same types of uncut strips of grass have been discovered in mowers having such fixed cutting units 6.

Figure 2:
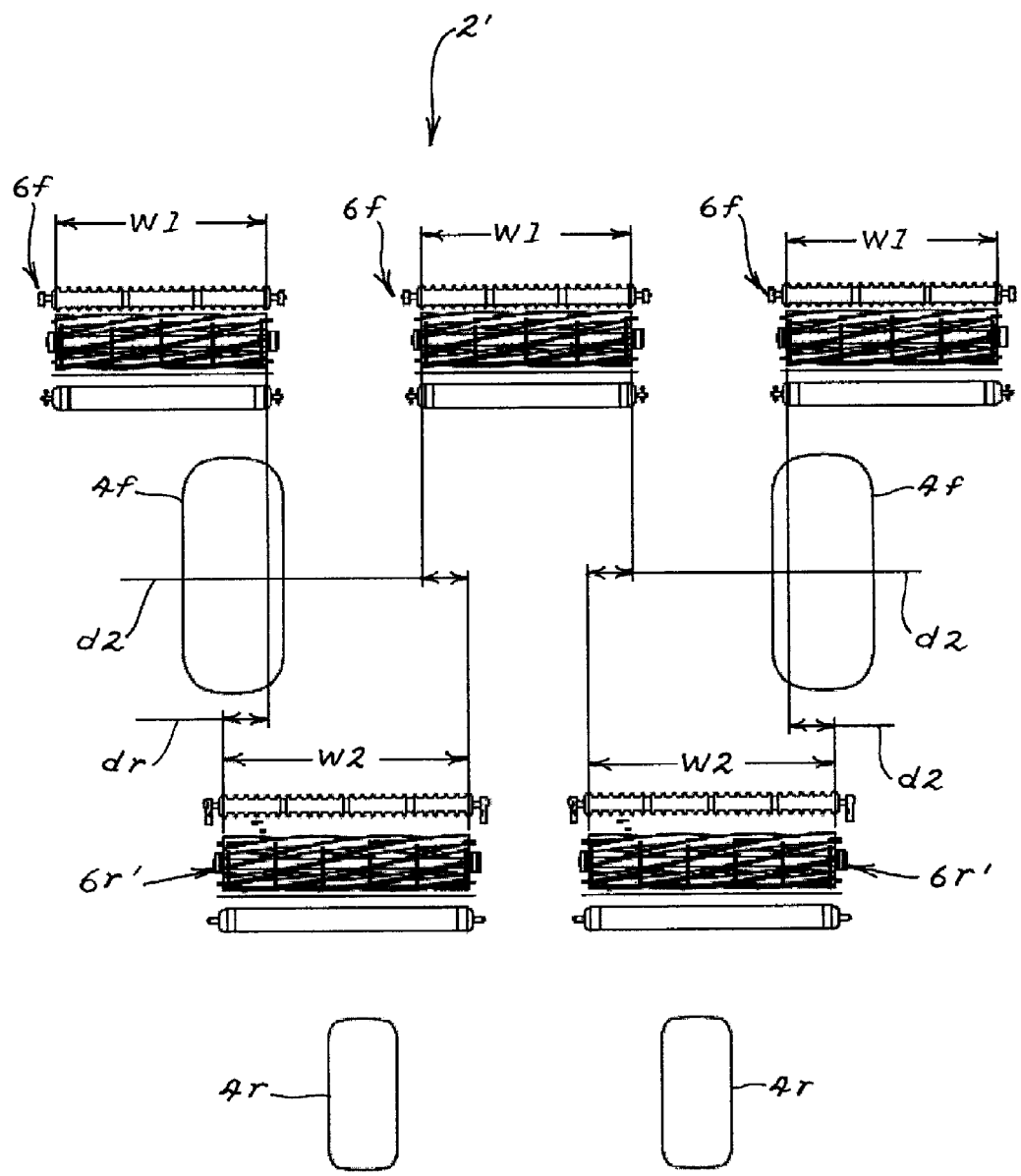
FIG. 2 is a top plan view of a reel gang mower according to this invention, particularly illustrating the same 3-2 fiveplex configuration as in FIG. 1 with the front cutting units being identical in size and having identical lateral spacing as the front cutting units in FIG. 1 but with the rear cutting units being larger in width to substantially increase the overlap between the front and rear cutting units.

The Applicants have solved this problem with a type of reel gang mower not previously known in the mower art, indicated as 2' in FIG. 2. Mower 2' is shown in FIG. 2 in the same fiveplex configuration as mower 2 in FIG. 1. Mower 2' includes the same three front cutting units 6f as used on mower 2 with front cutting units 6f having the same cutting width w1 and being laterally spaced apart identically to their spacing in FIG. 1 to provide the same gaps g as are shown in FIG. 1. Mower 2' also includes two rear cutting units 6r' that remain centered on gaps g between front cutting units 6f. However, in mower 2' of this invention, rear cutting units 6r are wider to provide a wider cutting width which is indicated as w2 in FIG. 2. Thus, the overlap distance between front and rear cutting units 6f and 6r' can be conveniently increased to a new and larger nominal value d2 by increasing the width of rear cutting units 6r' while leaving front cutting units 6f alone.

Figure 4:
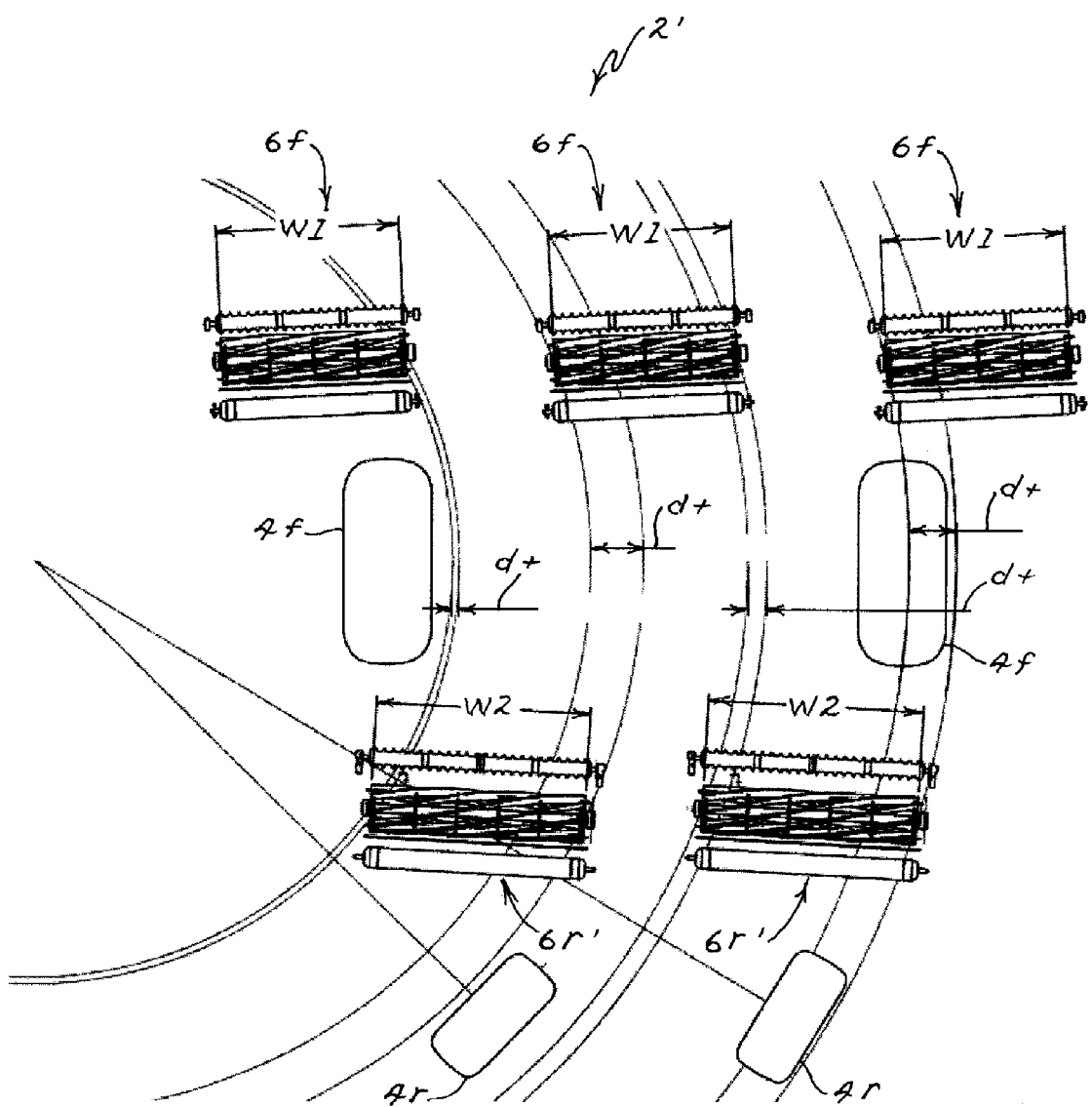
FIG. 4 is a view similar to FIG. 3 but of the mower of this invention as shown in FIG. 2 executing the same type of turn as is shown in FIG. 3 to illustrate that overlap is now maintained between all sides of the front and rear cutting units during the turn to eliminate the uncut strip of grass shown in FIG. 3.

Referring now to FIG. 4, mower 2' of this invention with the wider rear cutting units 6r' solves the streaking problem shown in FIG. 3 that was generated by mower 2. The additional overlap distance provided by the wider rear cutting units 6r provides enough overlap that the overlap distance d never disappears during turns of mower 2. Thus, as shown in FIG. 4, the innermost side of the left front cutting unit 6f and the outermost side of the left rear cutting unit 6r' retain a positive overlap d+ during the turn such that no spaces appear anywhere between any of the normally overlapped sides of front and rear cutting units 6f and 6r. The uncut strip of grass shown in FIG. 3 by the cross-hatching never appears when using mower 2 of FIG. 4 in the same type of turn as in FIG. 3. Instead, a positive overlap distance d+ is maintained in all four of the overlaps.

Figure 5:
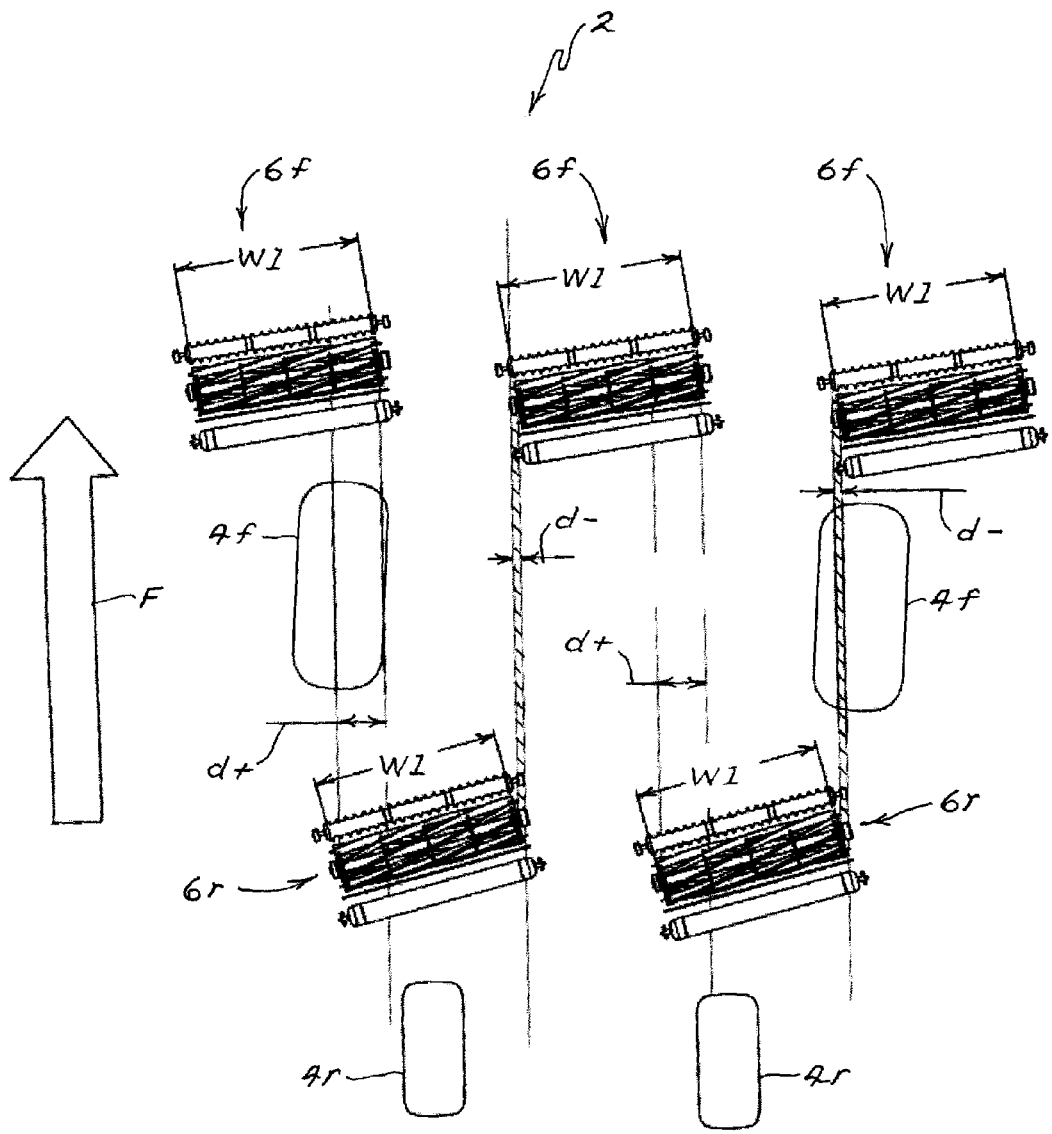
FIG. 5 is a top plan view of the prior art mower of FIG. 1 traveling laterally on a sidehill with the front cutting units having 12° degrees of yaw and with the rear cutting units have 18° of yaw and showing that two uncut strips of grass appear between the downhill sides of the rear cutting units and the uphill sides of the two lowermost front cutting units.
Figure 6:
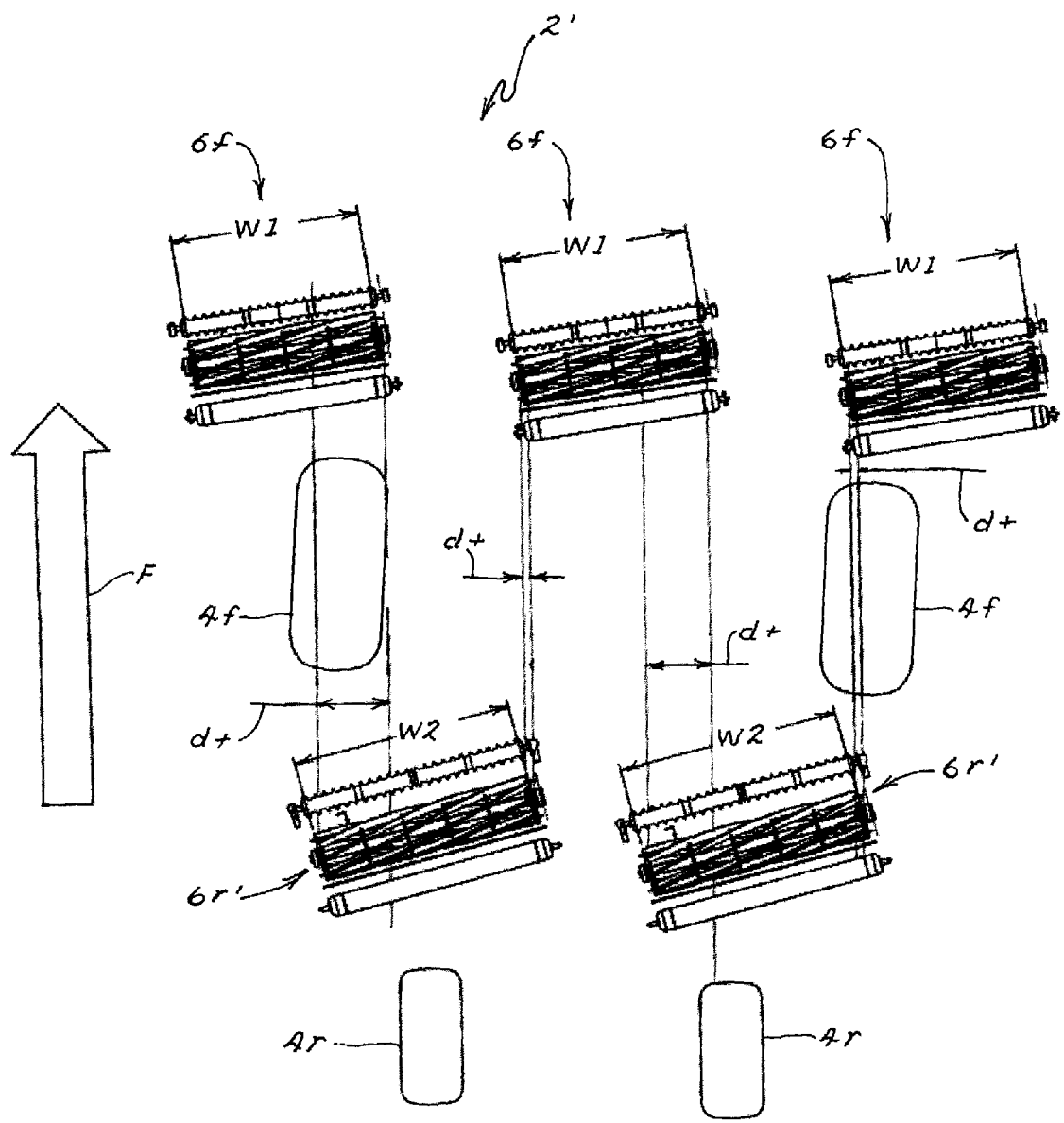
FIG. 6 is a view similar to FIG. 5 but of the mower of this invention as shown in FIG. 2 traveling laterally on the same sidehill as is shown in FIG. 5 to illustrate that overlap is now maintained between all sides of the front and rear cutting units during the sidehill traverse to eliminate the two uncut strips of grass shown in FIG. 5.

The Applicants have found that similar results are achieved by mower 2' of this invention in comparison to mower 2 in both S turns and when traversing a sidehill. The sidehill comparison is shown in FIGS. 5 and 6. When mowing along a sidehill with mower 2 driving laterally across the sidehill in a forward direction of travel indicated by the arrow F in FIG. 5, Applicants have found that mower 2 often leaves two uncut strips of grass as indicated by the cross-hatching in the spaces d− where the overlap distance has gone negative. However, when mower 2' of this invention is placed in the same sidehill mowing situations, the wider rear cutting units 6r' maintain a positive overlap distance d+ at all times, thereby eliminating the uncut strips of grass as shown in FIG. 5. This improves the aftercut appearance of the cut grass swath.

Figure 7:
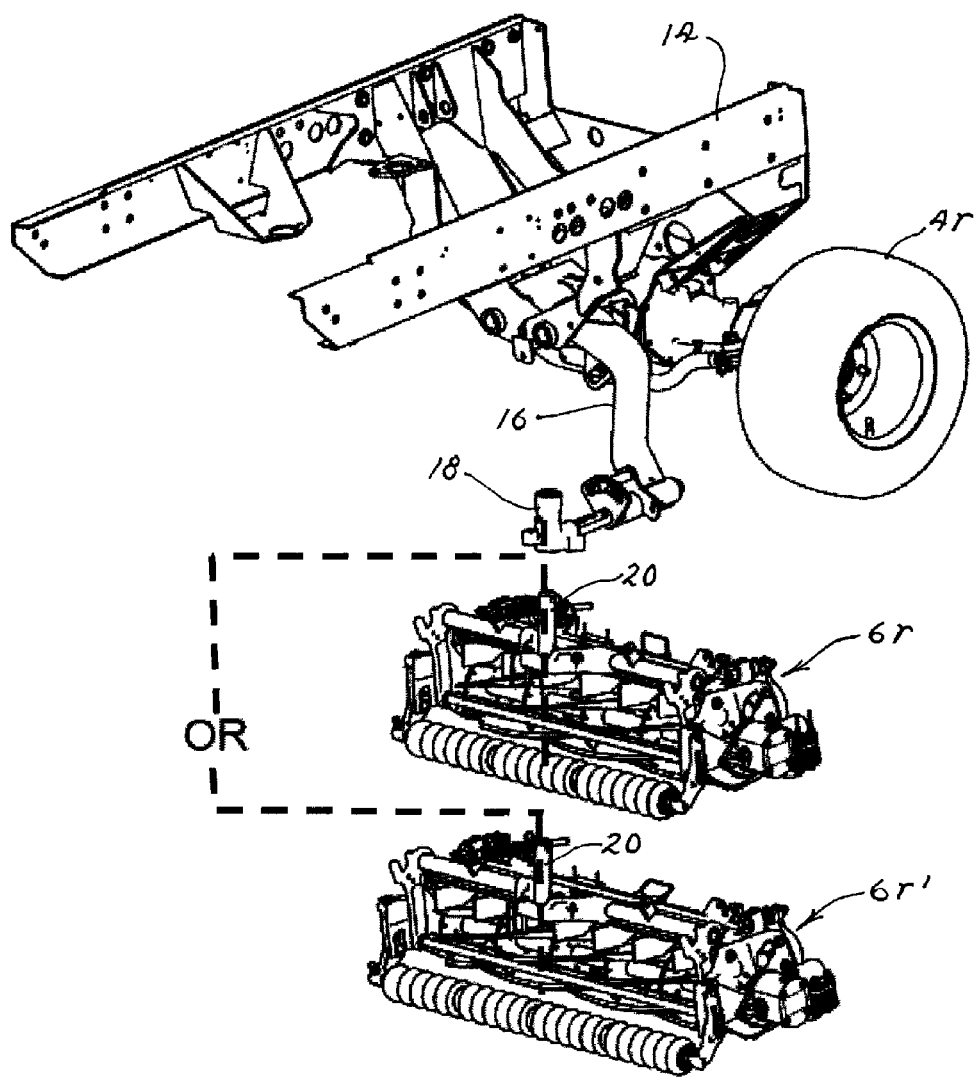
FIG. 7 is a perspective view of a portion of the mower of FIG. 2, particularly illustrating the lift arm for one of the rear cutting units and the fact that a cutting unit matching the size of the front cutting units or a cutting unit that has a width larger than the front cutting units can alternatively be coupled to the rear lift arm.

FIG. 7 illustrates a rear frame portion 14 of mower 2, 2' and one of the rear lift arms 16 that connects to one rear cutting unit 6r, 6r'. Lift arm 16 has a hub 18 that receives a spindle 20 attached to rear cutting unit 6r, 6r' with the hub/spindle interconnection providing the yaw ability for rear cutting unit 6r, 6r'. In prior art mower 2, a reel cutting unit 6r having a cutting width w1 that is identical to the cutting width w1 of front cutting units 6f is attached to each rear lift arm on mower 2. In mower 2' according to this invention, a reel cutting unit 6r' having an increased cutting width w2 compared to the cutting width w1 of front cutting units 6f is alternatively used on each rear lift arm on mower 2.

Mower 2' of this invention provides various advantages compared to mower 2. The most apparent is the elimination of the various streaks in the cut grass swath in certain types of mowing situations that would have been left by mower 2. This improves the aftercut appearance of the cut grass swath and is highly desirable where the appearance of the grass is particularly important, such as on golf courses. In addition, mower 2' achieves this result while retaining the usual spacing between front cutting units 6f to thereby maximize the size of the swath for a certain sized reel cutting unit and without creating any interference issues for front cutting units 6f as such cutting units 6f are placed into their transport positions. The use of wider reel cutting units as rear cutting units 6r' does not create such interference issues with respect to rear cutting units 6r'.

One embodiment of a mower 2' according to this invention has a cut grass swath of 121", employs three front cutting units 6f having a 27" cutting width, two rear cutting units 6r' having a cutting width of approximately 32" (more exactly 31.63"), and provides a nominal overlap distance of approximately 5.8" between front and rear cutting units 6f and 6r. Preferably, rear cutting unit 6r' has a cutting width that is at least about 15% larger than the cutting width of front cutting unit 6f. It has been found that this configuration of front and rear cutting units leaves substantially no uncut strips of grass and maintains positive overlap distances d+ in a substantial majority of turn and sidehill mowing situations shown in FIGS. 4 and 6. Such a mower 2' will be particularly useful as a trim mower where many such turn and sidehill mowing situations will be encountered. In many cases, mower 2' would be initially sold and equipped in this trim mower configuration by having a customer order mower 2' with the wider rear cutting units 6r' and the smaller front cutting units 6f.

On the other hand, if mower 2' is intended to be used primarily as a fairway mower where mowing on flatter ground and in generally straight fore-and-aft directions is more the norm, then mower 2' could be initially sold and equipped with five identically sized cutting units 6f and 62, e.g. all having a 27" cutting width in the example above. However, even in such a fairway mower configuration, the more traditional 2.5" inch overlap distance d1 used in prior art fairway mowers is preferably increased to 3.5" to help insure that the overlap distance always remains positive even during the types of gentler turns that are typically executed by such fairway mowers while mowing. If the owner or operator of such a fairway mower subsequently discovers that some streaking is being caused by uncut strips of grass left by this type of fairway mower in some of the mowing situations encountered by such fairway mower, the owner or operator could then replace the 27" rear cutting units 6r with the two wider 32" rear cutting units 6r' in the example above to solve this problem, all without having to touch or adjust the 27" front cutting units 6r or even change the rear lift arms 16.

Various modifications of this invention will be apparent to those skilled in the art. For example, other embodiments of mower 2' can have differently sized front and rear cutting units 6*f* and 6*r'* as long as rear cutting units 6*r'* are distinctly longer than front cutting units 6*f* as shown in the two examples below:

|  | Cutting Width of Front Cutting Units 6f | Cutting Width of Rear Cutting Units 6r' |
| --- | --- | --- |
| Example 1 | 22" | 27" |
| Example 2 | 18" | 22" |

Moreover, mower 2' could have a triplex configuration in which a pair of front cutting units 6*f* is followed by a single rear cutting unit 6*r'*. Accordingly, the scope of this invention is to be limited only by the appended claims.

The invention claimed is:

1. A gang reel mower, which comprises:
   (a) a frame having a pair of front ground engaging wheels and a pair of rear ground engaging wheels, one wheel pair being drive wheels and the other wheel pair being steerable wheels;
   (b) a plurality of laterally spaced front reel cutting units providing at least one lateral gap therebetween with each front reel cutting unit providing a width of cut, the front reel cutting units being located in advance of the front wheels of the frame, each gap being covered by a rear reel cutting unit having a width of cut that spans the gap ahead of each rear reel cutting unit and that extends beyond opposite sides of the gap to also overlap by an overlap distance a portion of the width of cut of the spaced front cutting units that form the gap such that all the front and rear reel cutting units collectively cut an unbroken swath of grass during a single pass of the mower, each rear cutting unit being located between the front and rear wheels of the frame;
   (c) a plurality of lift arms for individually coupling the front and rear reel cutting units to the frame to permit each reel cutting unit to be dropped down relative to the frame into engagement with the ground to mow grass or to be lifted up relative to the frame off the ground into a raised, non-operative transport position; and
   (d) wherein the width of cut of each rear reel cutting unit is wider than the width of cut of each front reel cutting unit.

2. The mower of claim 1, wherein the width of cut of each rear reel cutting unit is at least about 15% wider than the width of cut of each front reel cutting unit.

3. The mower of claim 2, wherein there are three of the front cutting units spaced apart laterally to form a pair of gaps, and wherein there are two of the rear cutting units each of which overlaps one of the gaps.

4. The reel gang mower of claim 1, wherein each rear reel cutting unit has a cutting width that is wider than a common cutting width of the front reel cutting units by an amount which is sufficient to maintain positive overlap between the front and rear reel cutting units while mowing when turning or in sidehill mowing such that substantially no uncut strips of grass are left in a cut grass swath provided by the mower.

5. The reel gang mower of claim 1, wherein each of the front and rear reel cutting units individually pivot on the frame about separate vertical yaw axes during turns of the frame such that the reel cutting units individually steer around the turns of the frame to minimize skidding of the reel cutting units during turns of the frame.

\* \* \* \* \*